(No Model.)
W. C. ROE.
LATHE CENTER.
No. 493,119. Patented Mar. 7, 1893.
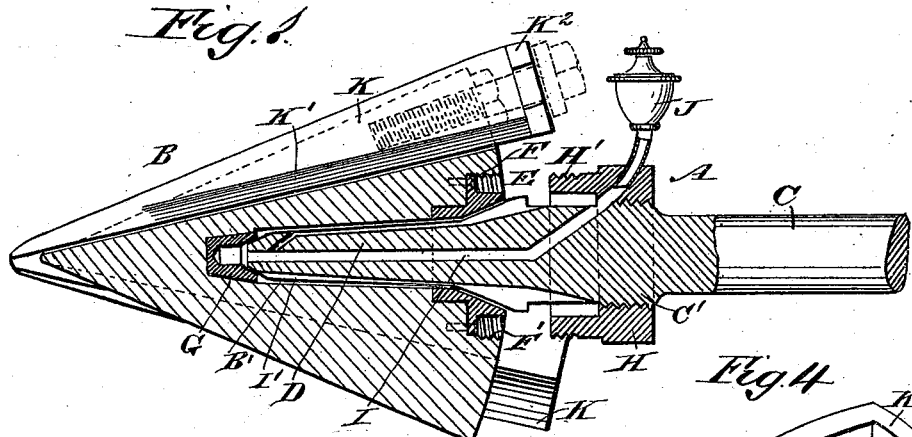
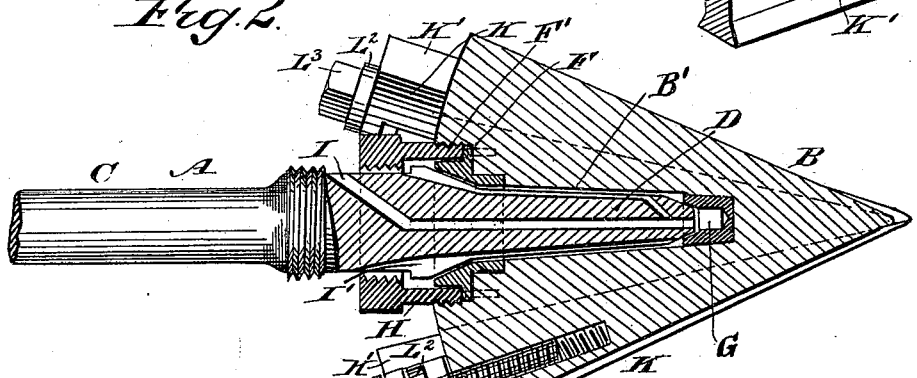
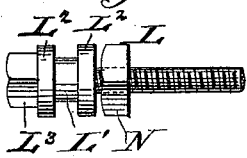
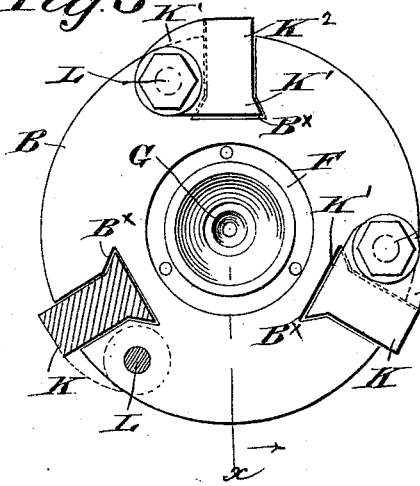
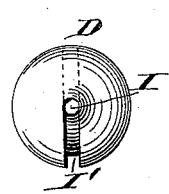
WITNESSES:
F. McArdle.
C. Sedgwick.
INVENTOR:
W. C. Roe
BY Munn & Co
ATTORNEYS
THE NORRIS PETERS CO., PHOTO-LITHO., WASHINGTON, D. C.

UNITED STATES PATENT OFFICE.

WILLIAM CHARLES ROE, OF HONOLULU, HAWAII.

LATHE-CENTER.

SPECIFICATION forming part of Letters Patent No. 493,119, dated March 7, 1893.

Application filed April 19, 1892. Serial No. 429,733. (No model.)

*To all whom it may concern:*

Be it known that I, WILLIAM CHARLES ROE, of Honolulu, Hawaiian Islands, have invented a new and Improved Lathe-Center, of which the following is a full, clear, and exact description.

The object of the invention is to provide a new and improved lathe center, which is simple and durable in construction, readily applied, and arranged to be conveniently adjusted to bring irregular work into a true position for turning it correctly.

The invention consists of certain parts and details and combinations of the same, which will be fu1/y described hereinafter and then pointed out in the claims.

Reference is to be had to the accompanying drawings forming a part of this specification, in which similar letters of reference indicate corresponding parts in all the figures.

Figure 1 is a sectional side elevation of the improvement on the line $x$—$x$ of Fig. 3. Fig. 2 is a similar view of the same in a different position and arranged for use as a live center in the main head stock spindle. Fig. 3 is a rear end view of the outer center. Fig. 4 is a perspective view of one of the gibs. Fig. 5 is a side elevation of one of the adjusting screw rods for the gibs; and Fig. 6 is an end view of the inner center.

The improved lathe center is provided with an inner fixed or dead center A, on which is mounted to turn an outer center B engaging the work to be turned. The inner or dead center A is provided with the usual shank C adapted to engage the tail stock or the main head stock spindle in case the device is used as a live center, as hereinafter more fully described.

The dead center A is formed at its front end with a conical center point and a tapered stem bearing part D having, at its rear end, a conical formed shoulder bearing E and adapted to engage the bearings F and G, of which the bearing F is secured in the rear end of the outer center B, while the other bearing G is placed in the bottom of the recess B′ for receiving the pointed part of D. The bearing G only engages the extreme conical end of the tapered stem bearing part D, as is plainly illustrated in Figs. 1 and 2.

In the outer base end of center B is formed an internal screw thread F′ adapted to be engaged by an external screw thread H′ formed on the nut H screwing on the threaded part C′ at the end of the shank C of the dead center A. This nut H serves the usual purpose of drawing the shank out of the tail stock. The nut H when unscrewed from the thread C′ and screwed in the threaded portion F′ in the outer base end of center B serves to unite the outer center B with the dead center A, so that both can be used as a live center in the main head stock spindle, see Fig. 2.

In the front portion of the center A is formed a centrally extending lubricating hole I, terminating at the extreme point to supply lubricant to the bearing G. The outer end of the hole I extends upward and is adapted to connect with a lubricating cup J for supplying the necessary lubricant to the said hole. The lubricant passes through the latter, and discharges into the hole in the bottom of center bearing, returning outward through grooves in the face of center bearing G, into the recessed cell B′, then outward through the groove I′ along the under side of stem, from directly behind the base of the front conical pointed part of stem D, rearwardly and out. When the central lubricating hole has become gummed up, the inlet groove on the top side of center A, is readily adapted to conduct the lubricant inwardly, lubricating the most essential bearings while running in to the interior, to directly behind the base of the front conical center bearing of stem D, where it is conducted through the hole on an angle from behind the base of front conical center, to the axial point of center, discharging into small hole in the bottom of center bearing G, and then returning outwardly through the grooves in face of center bearing G, into the recessed cell B′. Thus any impure or used up lubricant at once flows with the flowing lubricant from the interior of center B to the outside, along the groove I′ extending along the under side of stem D, as is plainly shown in Figs. 1 and 6. The outer center B is in the shape of a cone in the sides of which are fitted to slide gibs K held adjustable longitudinally, and extending one on the other so that irregular work can be readily centered to run true. Each of the gibs K is formed with a dovetail K' fitted to slide in a corresponding dovetail groove B' arranged in the center B and extending throughout the entire length thereof. As illustrated in Fig. 3, only three gibs K are employed, but the number may be increased as desired. Three gibs, however, fully answer all practical purposes. The points of the several gibs K extend beyond the point of the body of the center B, so that the points of the said gibs which are pointed to the usual center point angle, readily engage the centers of shafting being directly supported by the axial point of center B.

Each of the gibs K is provided, at the base end of the center, with a projection $K^2$, preferably forked, to engage the shank L' of a screw rod L screwing in the body of the center B. The forked projection $K^2$ extends between two collars $L^2$ held on the said screw rod L, so that when the latter is adjusted in the center B, the gib K is moved inward or outward and is thus adjusted longitudinally. By this movement of the gib its outer edge can be drawn a suitable distance beyond the side of the cone center B or moved with the outer edge below the side, that is, to be withdrawn into the cone center, as described.

On the outer end of the shank L' of each screw rod L is formed a head $L^3$ adapted to be engaged by a wrench or other suitable tool, for conveniently turning the said screw rod so as to adjust the respective gib K longitudinally in the center B. A jam nut N screws on the threaded portion of the screw rod L, and is adapted to abut against the base end of the center B to lock the screw rod in position after the gib is adjusted to the proper place.

It will be seen from the foregoing that the several gibs are adjusted independently one of the other, so that either of the gibs may be moved with its outer edge further from the side of the cone center or nearer thereto, as desired so that irregular work can be centered to run true.

If the center is to be used as a live center, the center bearings F and G are readily taken out from the outer center B when desired, by drawing a tapered pin through small holes that run through sidewise of the outer center B at the bottom of the centers E and G. The nut H' is screwed into the threaded portion F', in the outer base end of center B, which jams the stem bearings stationary together, the shank C then engaging the main head stock spindle in the usual manner.

Having thus described my invention, I claim as new and desire to secure by Letters Patent—

1. In a lathe center, the combination with an inner fixed center, of an outer conical center on the fixed center, and a nut on the inner center and engaging the outer center to connect the two together, substantially as described.

2. In a lathe center, the combination with an inner tapered center provided with a shoulder bearing and a conical point, of an outer center on the inner center and provided with inner and outer bearings, and a nut on the inner center and engaging the outer center, substantially as described.

3. In a lathe center, the combination of an inner center provided with the longitudinal lubricating passage I, recessed cell B' and groove I' and an outer center provided with the bearings F G, substantially as herein shown and described.

4. A lathe center provided with a fixed or dead center having a tapered stem bearing part, and having a cone-shaped shoulder bearing on the rear end of said stem bearing, and a conical angled center point on front end of said stem and adapted to engage the outer center; and provided with two grooves, one on the top side of stem, the other one on the under side of stem, the groove on top side of stem connecting with the hole behind the base of the front conical face and leading to the axial point at front end of said conical face, the two grooves extending longitudinally along the stem, from directly behind the base of the front conical angled center face and rearwardly, and through the rear cone-shaped shoulder-bearing, substantially as shown and described.

5. In a lathe center, the combination with a fixed or dead center having a pointed part, of an outer center made cone-shaped and formed with bearings adapted to engage the said pointed part, gibs fitted to slide on the sides of the said outer cone-shaped center, and a nut held on the said fixed or dead center and adapted to screw into the base of said outer center, substantially as shown and described.

WILLIAM CHARLES ROE.

Witnesses:
WM. J. FORBES,
T. W. HOBSON.